(12) United States Patent
Leidescher (10) Patent No.: US 10,890,290 B2
(45) Date of Patent: Jan. 12, 2021

(54) ADDITIVELY MANUFACTURED AUXILIARY DEVICE AND METHOD FOR ATTACHING A CONNECTION PART

(71) Applicant: Premium Aerotec GmbH, Augsburg (DE)

(72) Inventor: Matthias Leidescher, Königsbrunn (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 100 days.

(21) Appl. No.: 15/939,412

(22) Filed: Mar. 29, 2018

(65) Prior Publication Data

US 2018/0283603 A1 Oct. 4, 2018

(30) Foreign Application Priority Data

Mar. 29, 2017 (DE) .......................... 10 2017 205 288

(51) Int. Cl.
| | | |
|---|---|---|
| *F16M 13/02* | (2006.01) | |
| *F16B 37/04* | (2006.01) | |
| *B33Y 10/00* | (2015.01) | |
| *B33Y 80/00* | (2015.01) | |
| *F16B 17/00* | (2006.01) | |
| *F16B 21/20* | (2006.01) | |
| *F16B 2/22* | (2006.01) | |

(52) U.S. Cl.
CPC ............. *F16M 13/02* (2013.01); *B33Y 10/00* (2014.12); *B33Y 80/00* (2014.12); *F16B 17/00* (2013.01); *F16B 37/041* (2013.01); *F16B 37/043* (2013.01); *F16B 37/044* (2013.01); *F16B 2/22* (2013.01); *F16B 21/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,672,732 A | * | 6/1987 | Ramspacher | F16B 5/02 29/429 |
| 5,337,983 A | * | 8/1994 | Mailey | F16L 3/137 248/68.1 |
| 5,871,320 A | * | 2/1999 | Kovac | F16B 37/0842 411/182 |
| 6,010,306 A | * | 1/2000 | Bucher | F04D 25/088 416/210 R |
| 7,114,221 B2 | * | 10/2006 | Gibbons | F16B 5/065 24/289 |
| 8,371,788 B2 | * | 2/2013 | Lange | F16B 5/065 411/112 |

(Continued)

*Primary Examiner* — Monica E Millner
(74) *Attorney, Agent, or Firm* — Jenkins, Wilson, Taylor & Hunt, P.A.

(57) ABSTRACT

An additively manufactured auxiliary device has a device body with a lower face, which is integrally connected to a component, and at least one mounting element, which projects from an upper face of the device body, wherein the at least one mounting element is arranged such that a contact face and at least one fastening element of the connection part can be attached to the device body such that the contact face of the connection part rests against the upper face of the device body in a planar manner, and such that each mounting element of the device body adjoins a fastening element of the connection part.

13 Claims, 14 Drawing Sheets

(56) References Cited

U.S. PATENT DOCUMENTS

| | | | | |
|---|---|---|---|---|
| 9,428,123 B2* | 8/2016 | Morris | ................ | B60R 16/0215 |
| 9,429,176 B2* | 8/2016 | Morris | ...................... | F16B 2/22 |
| 9,447,806 B2* | 9/2016 | Morris | ................... | F16B 5/0628 |
| 9,457,845 B2* | 10/2016 | Morris | ................... | B62P 27/02 |
| 9,463,538 B2* | 10/2016 | Morris | ................... | B23P 19/04 |
| 9,488,205 B2* | 11/2016 | Morris | ................... | F16B 5/0664 |
| 9,511,544 B2* | 12/2016 | Hemingway | ......... | B29C 64/141 |
| 9,511,802 B2* | 12/2016 | Morris | ................... | B62D 27/06 |
| 9,541,113 B2* | 1/2017 | Morris | ................... | F16B 19/02 |
| 9,599,279 B2* | 3/2017 | Morris | ................ | F16M 11/041 |
| 9,657,807 B2* | 5/2017 | Morris | ................... | F16B 5/0628 |
| 9,689,419 B2* | 6/2017 | Nakamura | .......... | F16B 37/0857 |
| 9,863,454 B2* | 1/2018 | Morris | ................... | F16B 17/00 |
| 10,107,319 B2* | 10/2018 | Morris | ................... | F16B 5/0628 |
| 2010/0102538 A1* | 4/2010 | Paxton | ................... | B60Q 3/64 |
| | | | | 280/728.3 |
| 2012/0225408 A1* | 9/2012 | Moore | ................ | A61C 8/0033 |
| | | | | 433/174 |
| 2014/0202628 A1* | 7/2014 | Sreetharan | .............. | H01L 41/25 |
| | | | | 156/257 |
| 2015/0023724 A1* | 1/2015 | Morris | ................... | F16B 5/0664 |
| | | | | 403/14 |
| 2015/0056009 A1* | 2/2015 | Morris | ................... | F16B 21/08 |
| | | | | 403/326 |
| 2015/0069779 A1* | 3/2015 | Morris | ................... | B62D 27/04 |
| | | | | 296/35.1 |
| 2015/0078805 A1* | 3/2015 | Morris | ................... | E05B 85/10 |
| | | | | 403/13 |
| 2015/0175217 A1* | 6/2015 | Morris | ................... | B62D 27/023 |
| | | | | 296/193.01 |
| 2015/0232131 A1* | 8/2015 | Morris | ................... | F16B 21/09 |
| | | | | 403/14 |

* cited by examiner

ND AUXILIARY
ADDITIVELY MANUFACTURED AUXILIARY DEVICE AND METHOD FOR ATTACHING A CONNECTION PART

CROSS-REFERENCE TO RELATED APPLICATION

This application claims priority to German patent application DE 10 2017 205 288.0 filed Mar. 29, 2017, the entire disclosure of which is incorporated by reference herein.

TECHNICAL FIELD

The present disclosure relates to an additively manufactured auxiliary device for attaching a connection part to a component. Furthermore, the disclosure herein relates to a method for attaching a connection part to a component.

BACKGROUND

In generative manufacturing methods, also commonly referred to as "3D printing methods", datasets are generated on the basis of geometric models, which datasets are used in a specific generative manufacturing system for producing objects of a predefined shape from amorphous materials, such as liquids and powders, or neutrally shaped semi-finished products, such as strip-, wire- or web-shaped material, by chemical and/or physical processes. 3D printing methods use additive processes in which the starting material is sequentially built up in layers in predetermined shapes.

3D printing methods are currently widely used in the production of prototypes or in rapid product development (RPD), in which a resource-efficient process chain is used to manufacture customised components in small or large batches as required. 3D printing methods can be used in a variety of ways in civil engineering, architecture, dental technology, toolmaking, implantology, industrial design, the automotive industry and also in the aerospace industry.

In order to manufacture aircraft and/or spacecraft, it is conventional to manufacture individual components separately and then connect them. The components required therefor can advantageously be produced by additive methods, but additional connection parts must usually be provided, since more complex shapes, such as threading for screws, can only be additively produced to a limited extent.

Attaching the connection parts in turn to the components involves additional effort as a result of drilling, riveting or similar processes. The necessary modifications offset the fundamental advantage of additive manufacture, which is that customised components are produced efficiently.

SUMMARY

Against this background, it is an idea of the present disclosure to provide the possibility of attaching a connection part to a component with little effort and in a cost-effective manner.

Accordingly, an additively manufactured auxiliary device comprising a device body is provided, which device body comprises a lower face, which is integrally connected to a component, and at least one mounting element, which projects from an upper face of the device body, the at least one mounting element being arranged such that a contact face and at least one fastening element of a connection part can be attached to the device body in such a way that the contact face of the connection part rests against the upper face of the device body in a planar manner, and such that each mounting element of the device body adjoins a fastening element of the connection part.

An auxiliary device of this kind can be produced in a simple and cost-effective manner, perhaps even in the same manufacturing process as the component. The component then does not need to be further modified for attachment of the connection part, which also saves time and money, and on account of the simplified attachment of the connection part, possible installation errors can be prevented.

In another embodiment of the disclosure herein, the at least one mounting element is designed such that, after attachment of the connection part to the device body, an additional securing part can be attached to the mounting element. Securing parts of this kind are very simple to produce. As a result, a particularly reliable securing of the connection part can be ensured without great expense.

In another embodiment of the disclosure herein, the mounting element comprises a through hole, which is designed such that a wire guided through the hole after attachment of the connection part to the device body secures the connection part by positive engagement. Suitable wires are very simple to produce and are particularly simple to remove again. In this way, the connection part can, for example for maintenance work, be released from the component again without difficulty.

In another embodiment of the disclosure herein, the at least one mounting element is designed in the shape of a column, on which the connection part is placed via the at least one fastening element designed as a hole. This allows a spatially particularly precise positioning of the connection part in relation to the component.

In another embodiment of the disclosure herein, the mounting element comprises a narrowing in the region close to the upper face. This is particularly advantageous for the attachment of a securing element in the form of a clamping ring.

In another embodiment of the disclosure herein, at least one mounting element comprises a recess, into which a fastening element of the connection part designed in the form of an edge can be inserted such that the mounting element secures the connection part by positive engagement. This makes it possible to use particularly simply constructed connection parts that do not have to comprise complexly designed fastening elements.

In another embodiment of the disclosure herein, the device body comprises at least one additional mounting element in the form of a raised portion, which secures the connection part after attachment thereof to the device body by positive engagement. Raised portions of this kind are very particularly simple to manufacture and can therefore further enhance the securing of the connection part without great expense.

In another embodiment of the disclosure herein, the device body comprises at least one spring element on the upper face that is designed to secure the connection part after attachment thereof to the device body by positive engagement. A spring element of this kind can be simply integrated into the auxiliary device. Since no additional steps need to be carried out, apart from placing the connection part on the auxiliary device, the process of attachment is particularly simple to carry out.

In another embodiment of the disclosure herein, at least one mounting element comprises a spring element that is designed to secure the connection part after attachment thereof to the device body by positive engagement. As a result, the connection part can be attached to the component in a particularly simple manner, since, apart from placing the connection part on the auxiliary device, no additional steps need to be carried out.

In another embodiment of the disclosure herein, the mounting element is designed to be plastically deformed after attachment of the connection part to the device body such that the mounting element secures the connection part by positive engagement. This makes it possible to secure the connection part in a particularly reliable manner without using additional accessories.

Furthermore, according to the disclosure herein, a method for attaching a connection part to a component is provided, the method comprising:

placing a contact face of the connection part onto an upper face of an auxiliary device, which comprises at least one mounting element and is integrally connected to the component, the at least one mounting element of the auxiliary device adjoining a fastening element of the connection part; and securing the connection part by positive engagement.

In another embodiment of the method, the securing step comprises attaching an additional securing part to the auxiliary device. This makes it possible to carry out the method in a particularly rapid manner without great effort on the part of the mechanic.

In another embodiment of the method, the placing step additionally comprises elastically deforming the connection part, the connection part returning to its original shape fully or in part after placement. As a result, a particularly stable securing of the connection part is possible without additional accessories or specially shaped mounting elements being required.

In another embodiment of the method, the securing step comprises plastic deformation of at least one mounting element of the auxiliary device. As a result, a particularly stable securing of the connection part is made possible without using additional parts.

In another embodiment of the method, the placing step additionally comprises elastic deformation of a mounting element of the auxiliary device designed as a spring element, the mounting element returning to its original shape fully or in part after placement.

The above embodiments and developments may be combined in any way, where appropriate. Further possible embodiments, developments and implementations of the disclosure herein also include combinations not explicitly mentioned of features of the disclosure herein described previously or in the following in relation to the embodiments. In particular, a person skilled in the art may add individual aspects as improvements or supplements to the relevant basic form of the present disclosure.

BRIEF DESCRIPTION OF THE DRAWINGS

The present disclosure is described in greater detail in the following with reference to the embodiments shown in the schematic figures of the example drawings, in which.

The accompanying drawings are intended to provide further understanding of the embodiments of the disclosure herein. They show embodiments and, in connection with the description, serve to explain principles and concepts of the disclosure herein. Other embodiments and many of the advantages mentioned become apparent in view of the drawings. The elements of the drawings are not necessarily shown true to scale relative to one another.

In the figures of the drawings, identical, functionally identical and operationally identical elements, features and components are provided with the same reference signs, unless otherwise stated.

DETAILED DESCRIPTION

In the context of the present disclosure, a "connection part" denotes a component of which the function is to make possible a rigid connection between two other components. Connection parts in this sense may have various shapes and dimensions and typically comprise elements such as thread inserts for screws, latching clamping devices, adhesive layers, magnets, or the like.

"Mounting elements" and "fastening elements" within the meaning of the present disclosure refer to individual elements of components that can be correspondingly interconnected. In a manufacturing process in which corresponding components are further processed, this connection is carried out by a mechanic, for example without using additional accessories or tools.

If, in the context of the present disclosure, two objects are described as being "integrally connected", this means that they cannot be separated from one another without considerable effort and use of tools. After separation of the two objects, they cannot be joined together again. However, "integrally connected" can also mean that the two objects are directly manufactured from one piece.

Figure 1:
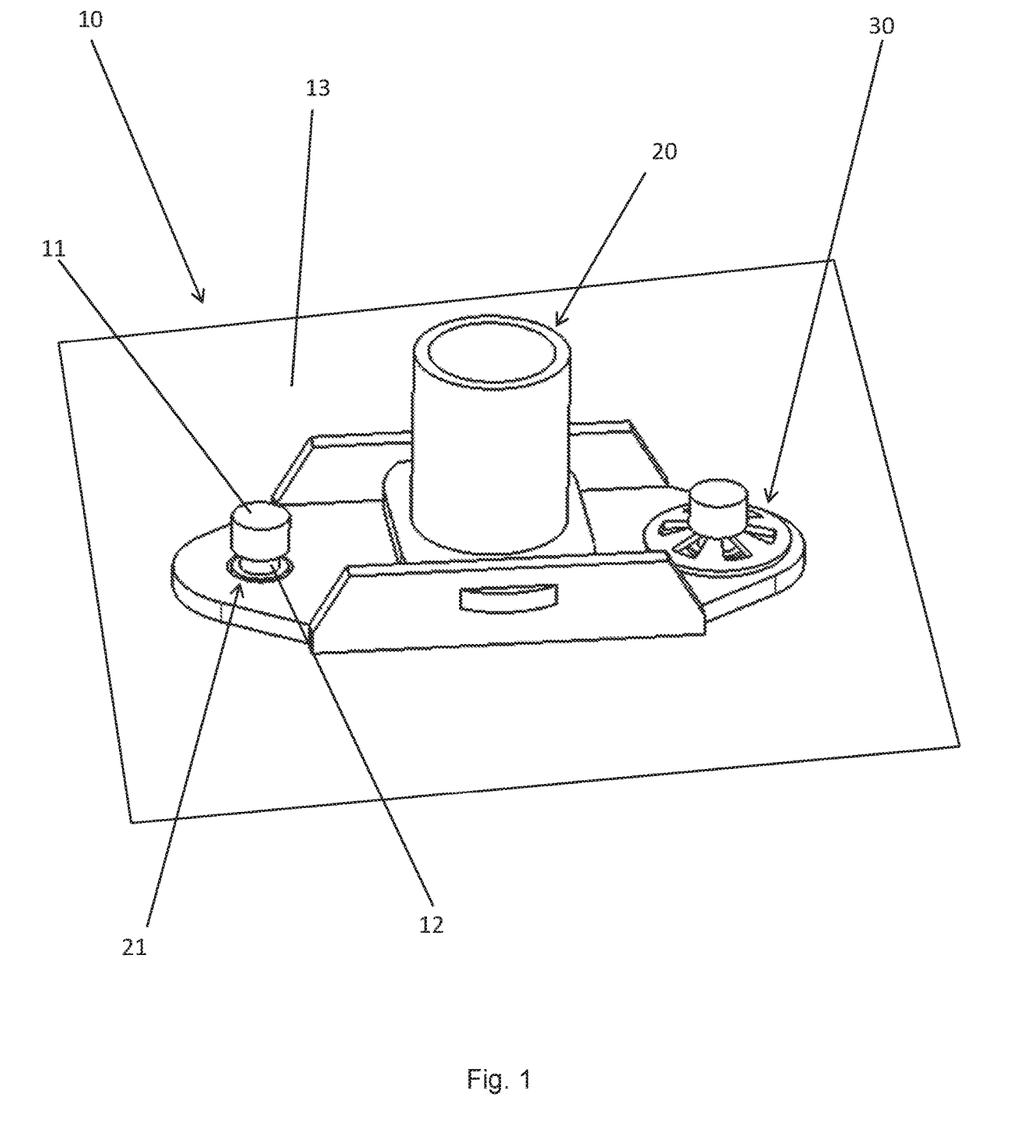
FIG. 1 is a view of an auxiliary device according to the disclosure herein.

FIG. 1 is an oblique view of an auxiliary device 10 to which a connection part 20 in the form of a plate nut is applied. The auxiliary device 10 in this case comprises two mounting elements 11 which are designed or configured in the shape of columns, each column comprising a narrowing 12 close to the upper face 13 of the auxiliary device 10. The fastening elements 21 of the connection part 20 are designed or configured in the form of holes which overlap with the mounting elements 11 of the auxiliary device 10. Additionally, in this case, a securing part 30 in the form of a clamping ring has been attached. The securing part 30 is inserted into the narrowing 12 of the mounting element 11 and secures the connection part 20 by positive engagement. This means that movement of the connection part, both translational and rotational, is prevented after attachment of the securing part.

Figure 2A:
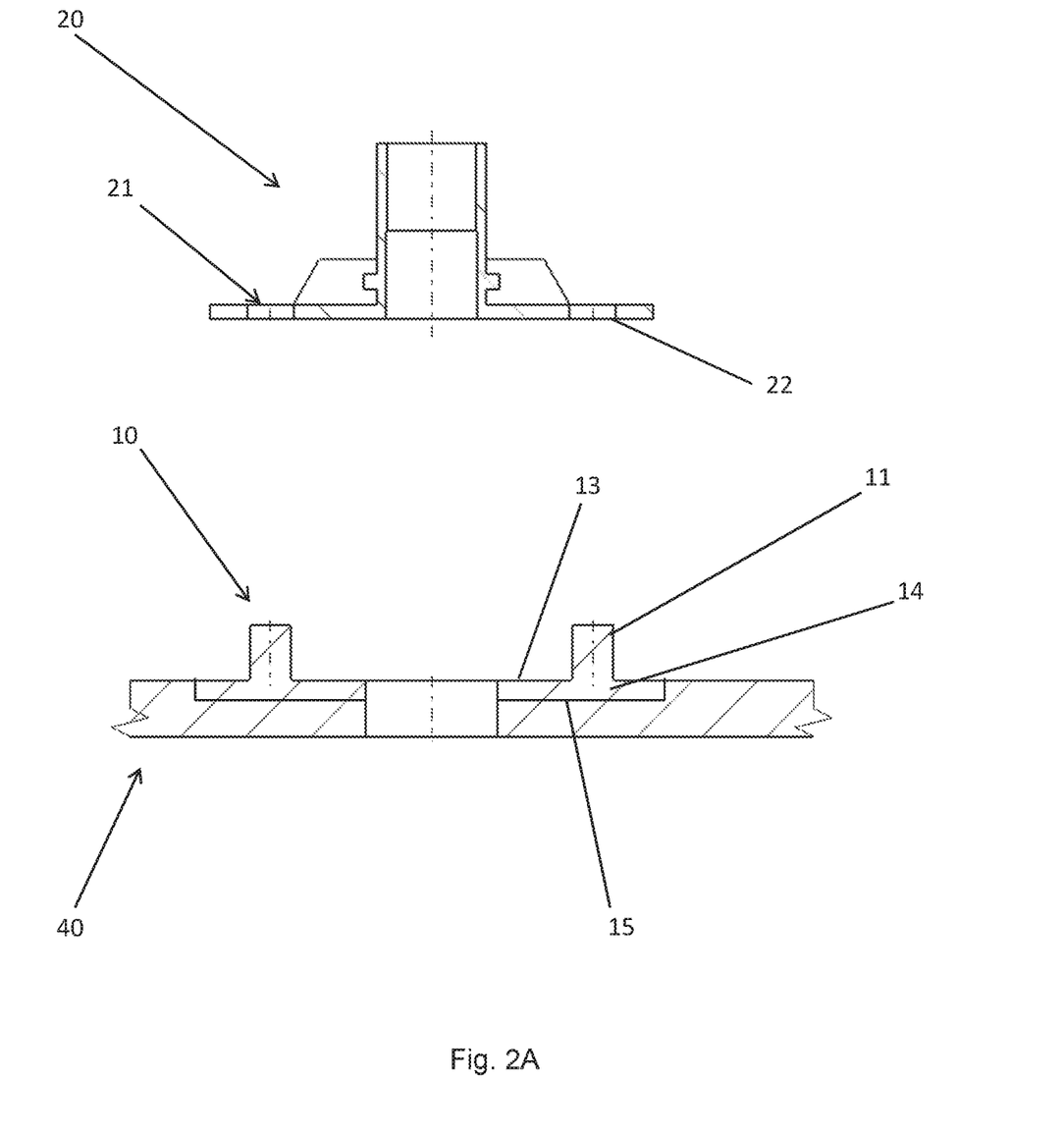
FIG. 2A-2C show method steps for attaching a connection part to an auxiliary device according to the disclosure herein.
Figure 2B:
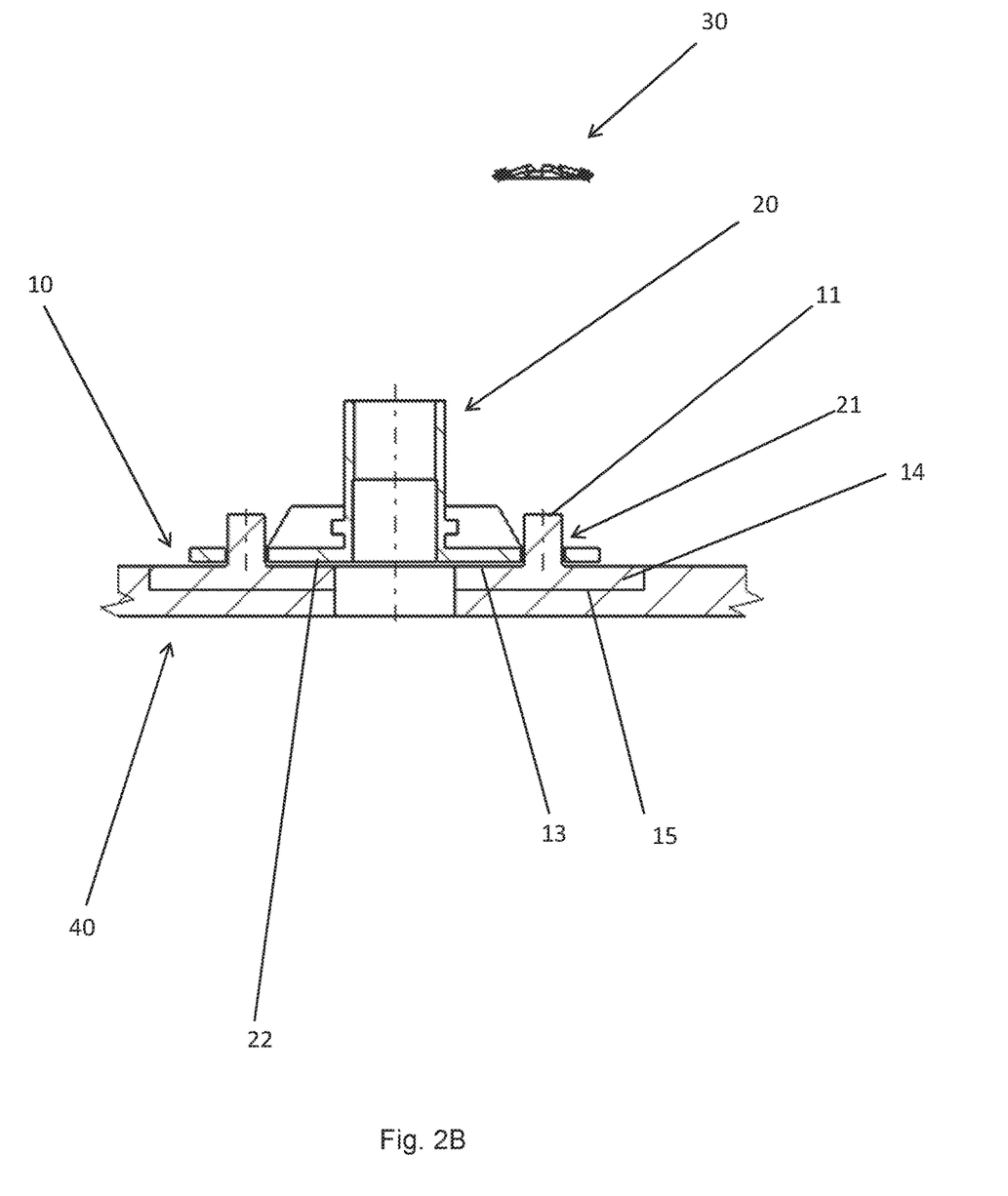
Figure 2C:
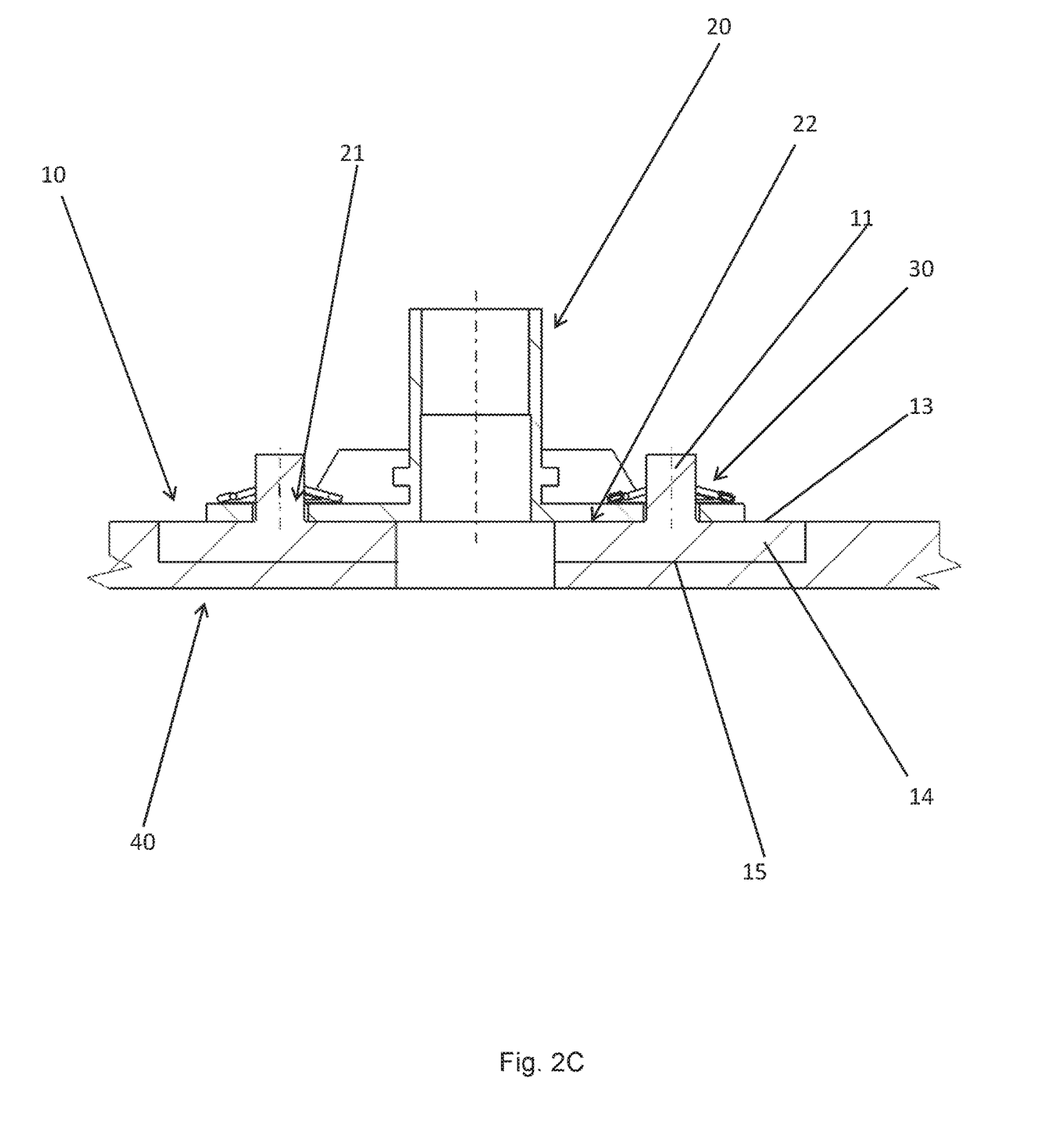

FIG. 2A through 2C show individual steps in a method for attaching a connection part to a component.

In FIG. 2A, the connection part 20 is spaced apart from the auxiliary device 10 and the component 40 in a starting position, the contact face 22 of the connection part facing the component 40. The auxiliary device 10 comprises a device body 14 that is integrally connected by a lower face 15 to the component 40. Two mounting elements 11, which are designed or configured in the shape of columns, project from the upper face 13 of the device body 14. The fastening elements 21 of the connection part 20, which are in this case designed as holes, may be located exactly vertically above the mounting elements 11 of the auxiliary device 10.

FIG. 2B shows the auxiliary device 10 after the connection part 20 has been attached. The contact face 22 of the connection part 20 rests against the upper face 13 of the device body 14 and the two fastening elements 21 adjoin the mounting elements 11. A securing part 30 in the form of a clamping ring may be arranged directly vertically above one of the pairs consisting of or comprising a mounting element 11 and fastening element 21.

FIG. 2C shows how two securing parts 30 in the form of clamping rings are attached to the mounting elements 11 of the auxiliary device 10 after attachment of the connection part. The securing parts 30 prevent the fastening elements 21 from being able to detach from the mounting elements 11 and thus secure the connection part 20 to the component 40.

Figure 3A:
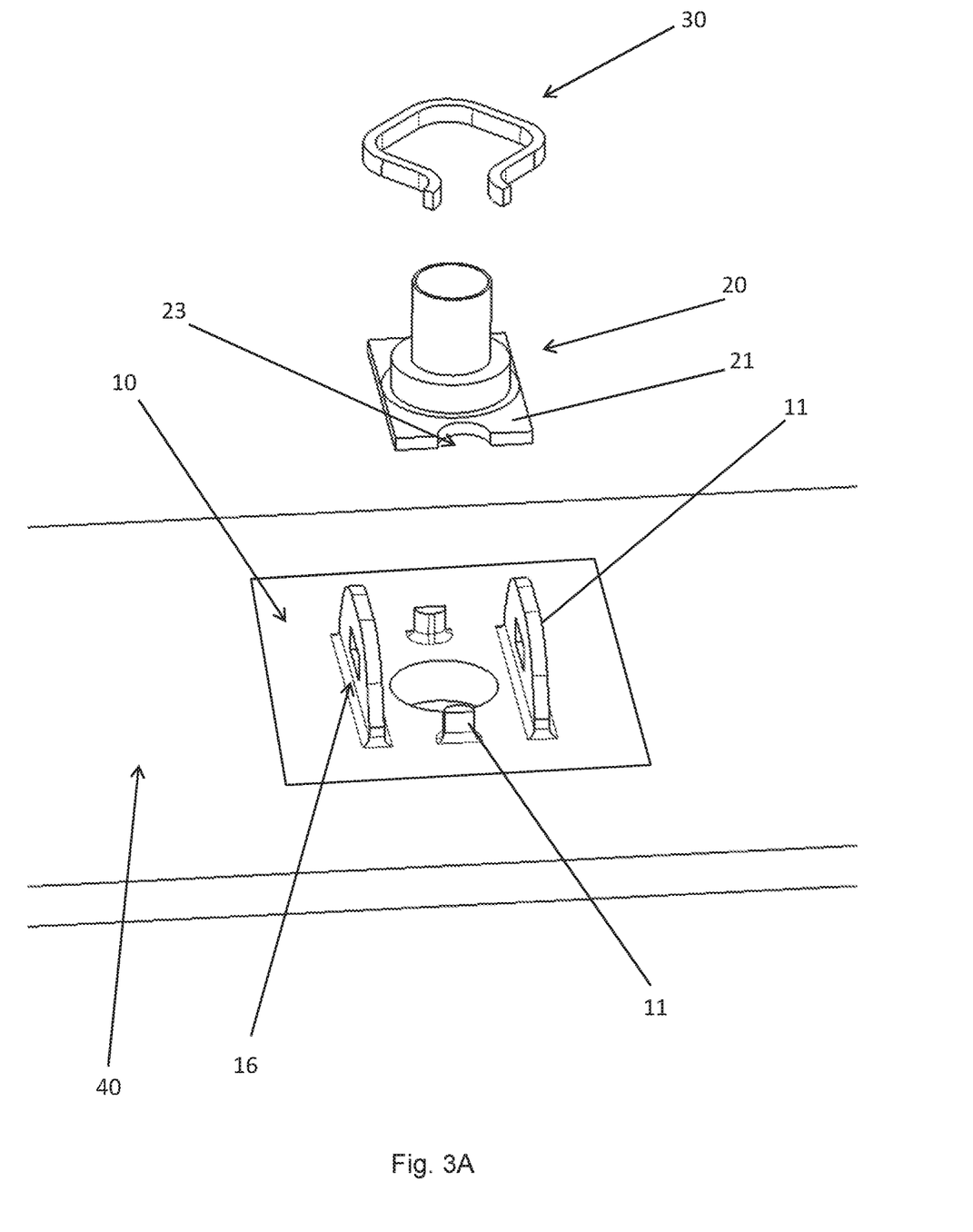
FIGS. 3A-3B are oblique views of another embodiment of an auxilary device.

FIG. 3A is an oblique view of another embodiment of an auxiliary device 10. The auxiliary device 10 comprises four mounting elements 11 in total. Two of the mounting elements 11 are designed as vertically upright plates each comprising a rectangular hole 16, and the other two mounting elements 11 are designed or configured in the shape of half cylinders. A connection part 20 is arranged vertically above the auxiliary device and comprises a fastening element 21 in the shape of a plate, the substantially rectangular outline of which comprises two indentations 23. An additional curved securing part 30 is arranged vertically above the connection part 20.

Figure 3B:
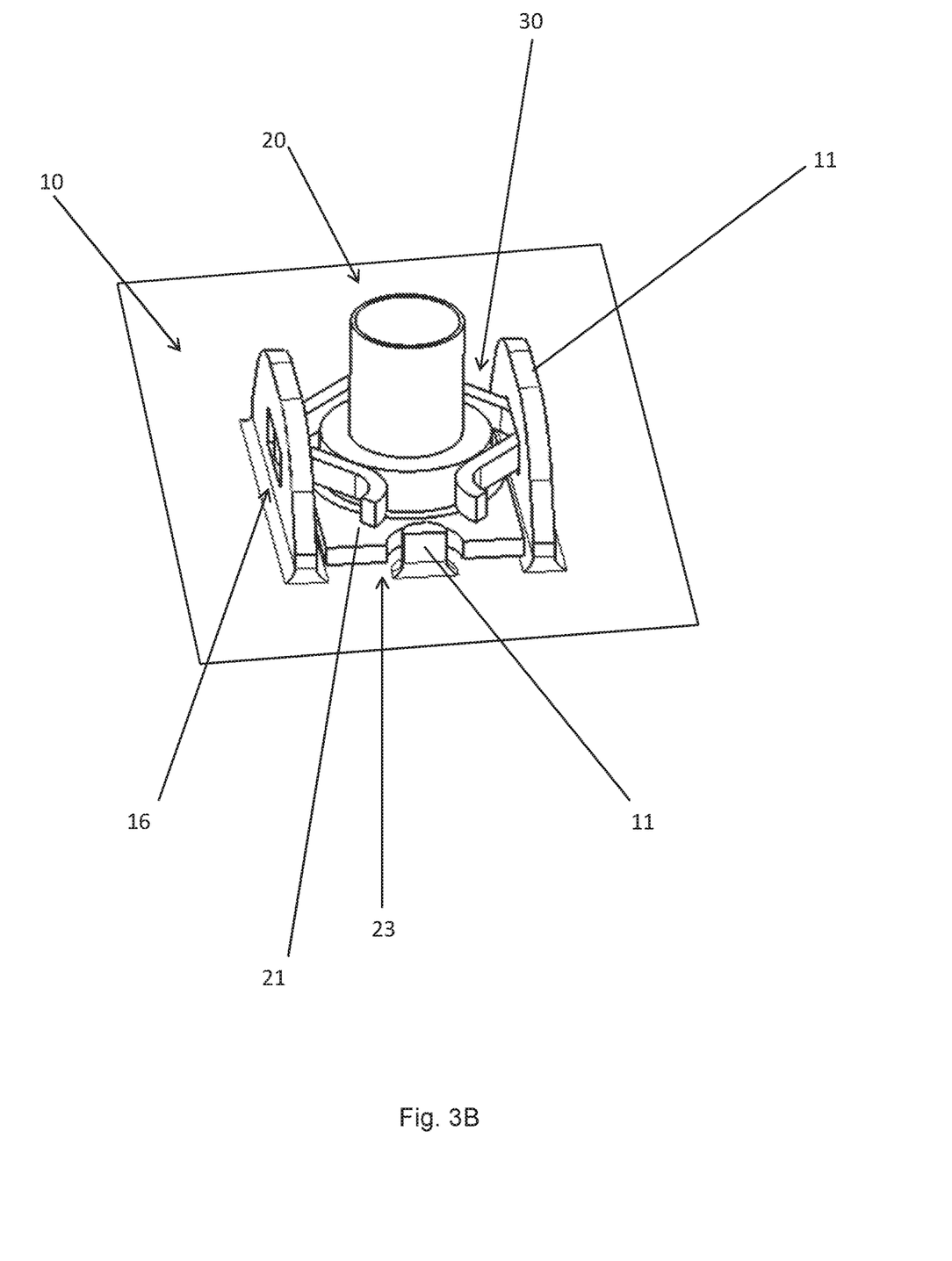

FIG. 3B is an oblique view of the auxiliary device 10 from FIG. 3A after attachment of the connection part 20 and the securing part 30. The indentations 23 in the fastening element 21 adjoin the half cylinder-shaped mounting elements 11 and the straight edges of the fastening element adjoin the plate-shaped mounting elements 11. The curved securing part 30 is clamped into the holes 16 of the mounting elements 11 and secures the connection part 20 by positive engagement.

Figure 4:
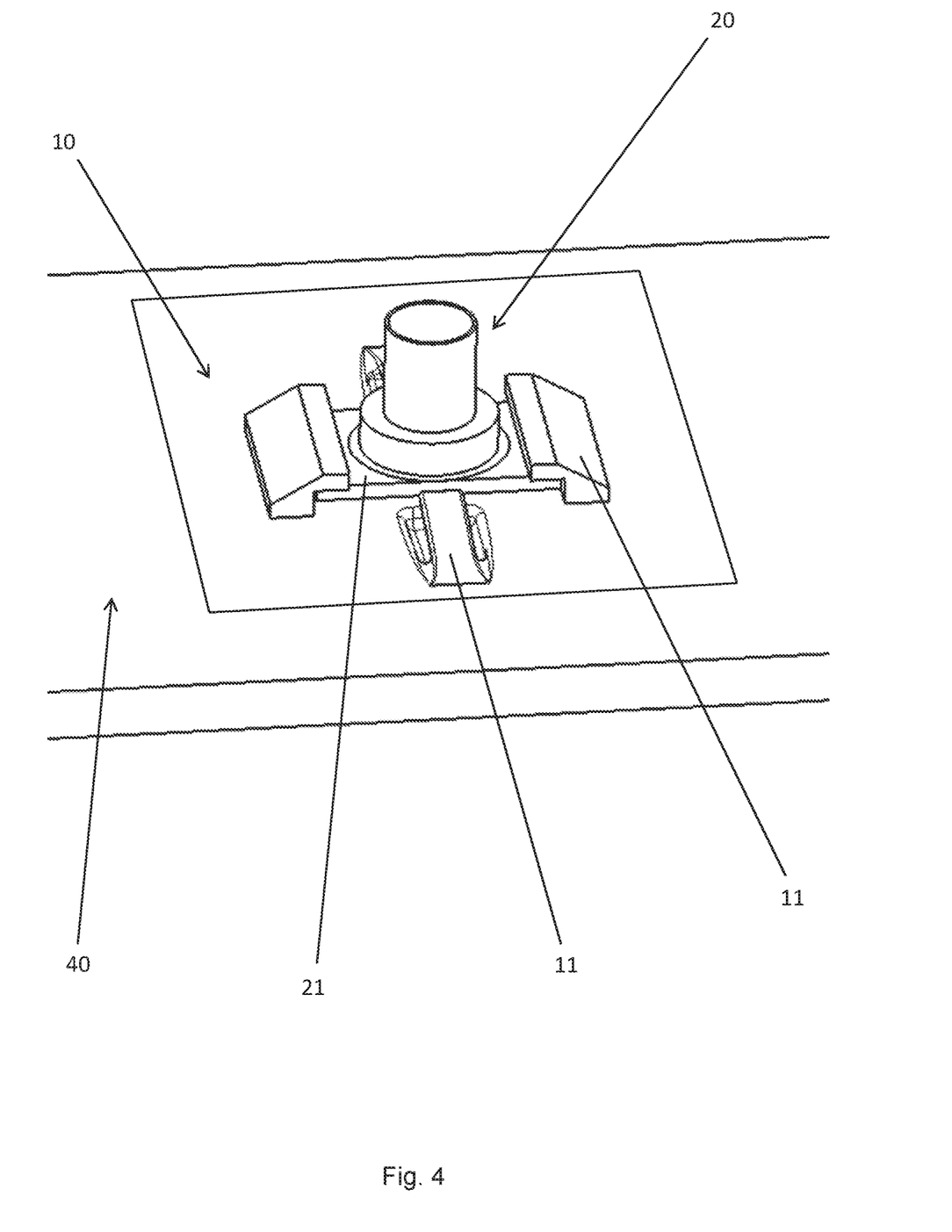
FIG. 4 is a view of another embodiment of an auxilary device.

FIG. 4 is an oblique view of another embodiment of an auxiliary device 10 in which a connection part 20 is secured. The auxiliary device 10 comprises four mounting elements 11 in total. Two of the mounting elements 11 comprise recesses which are designed to adjoin the edges of a fastening element 21 of the connection part 20 designed as a plate. The other two mounting elements 11 are designed or configured in the form of spring elements that secure the connection part 20 by positive engagement.

Figure 5A:
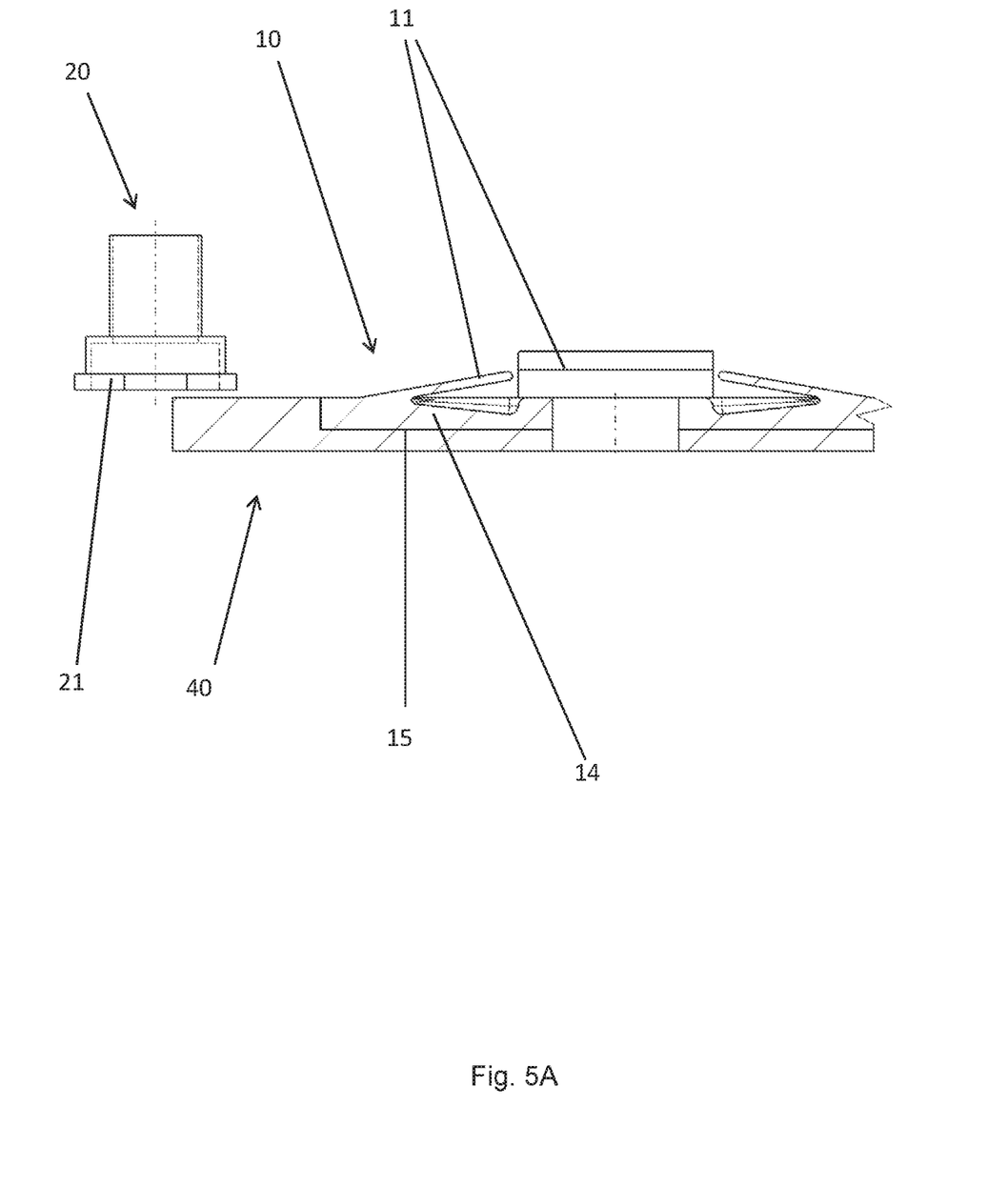
FIGS. 5A-5C show method steps for attaching a connection part to the auxiliary devcie from FIG. 4.
Figure 5B:
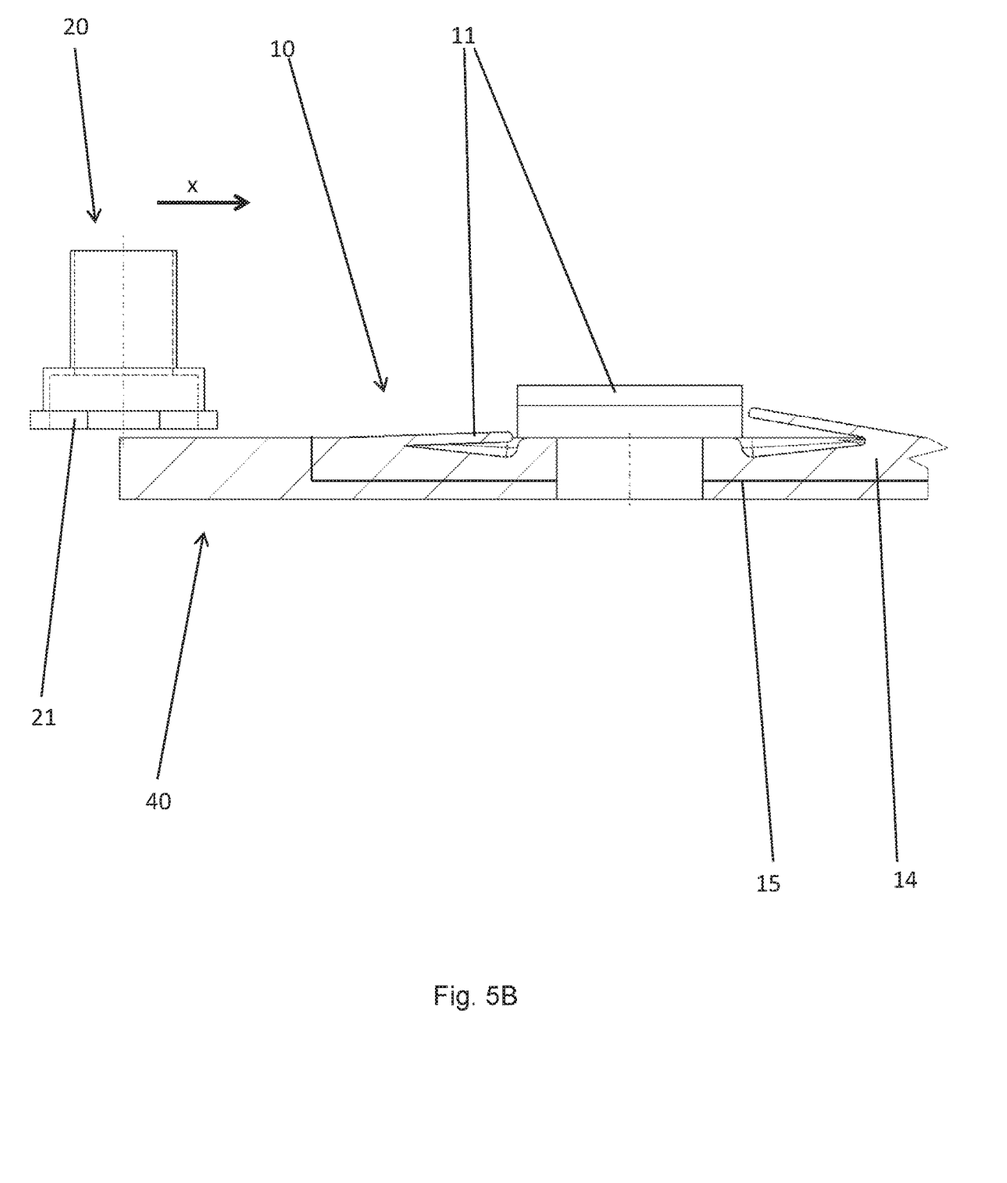
Figure 5C:
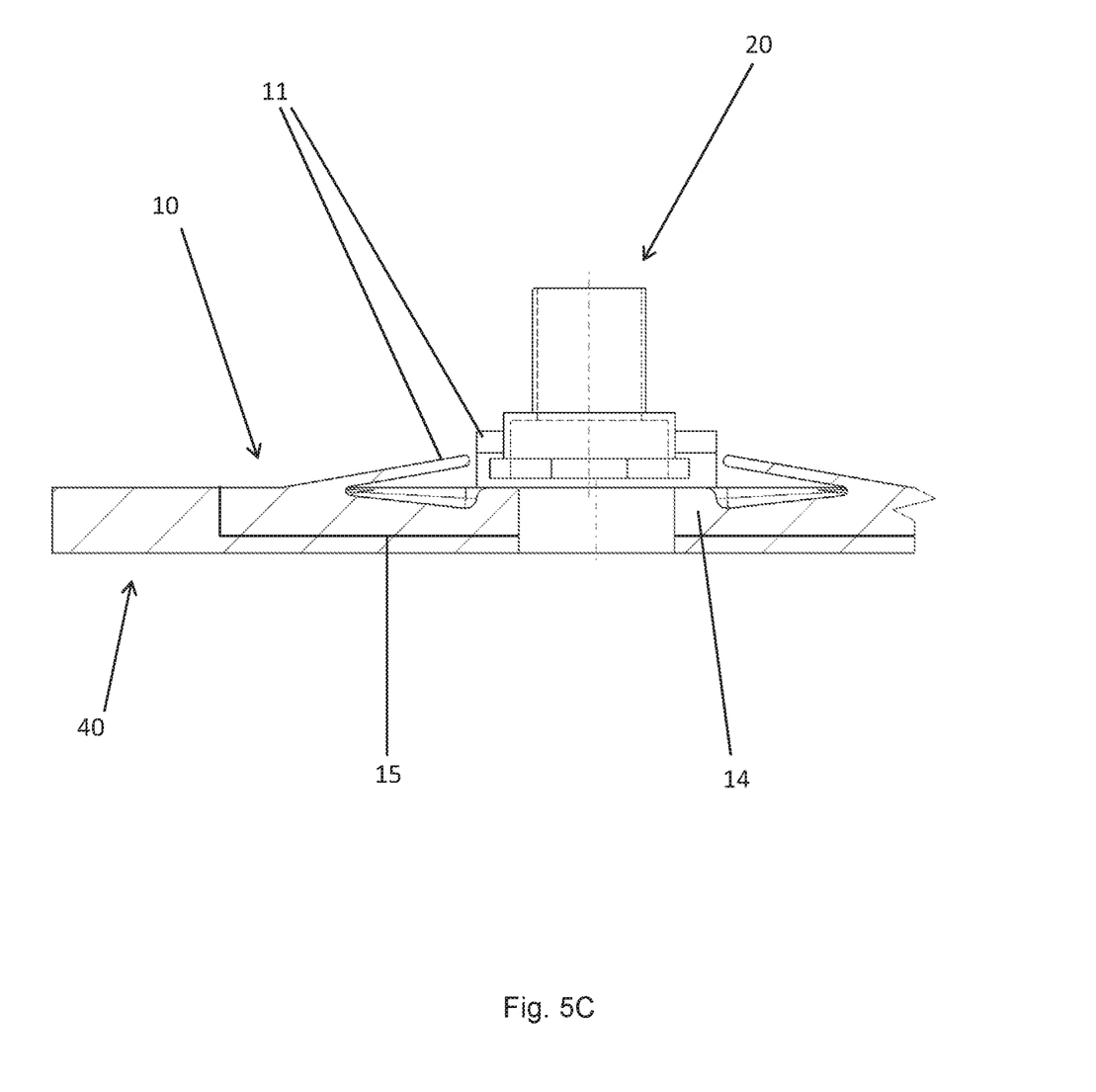

FIG. 5A through 5C show steps of a method, by which a connection part is attached to a component comprising an auxiliary device as shown in FIG. 4.

FIG. 5A shows a cross section through the component 40 and the connection part 20. The auxiliary device comprises a device body 14 which is integrally connected by a lower face 15 to the component 40. The mounting elements 11 designed or configured as spring elements are in their original position. The connection part 20 is arranged to the side of the auxiliary device 10.

In FIG. 5B, the left-hand mounting element 11 designed or configured as a spring element is curved downwards. The connection part 20 can thus be moved without difficulty in the x direction and the edges of the fastening element 21 are pushed into the recesses in the mounting elements 11.

In FIG. 5C, the connection part 20 has reached its desired position. The left-hand spring element 11 has returned to its original position and the two spring elements 11 secure the connection part 20 in the horizontal direction by positive engagement.

FIG. 6A through 6D show further embodiments of the auxiliary device 10.

Figure 6A:
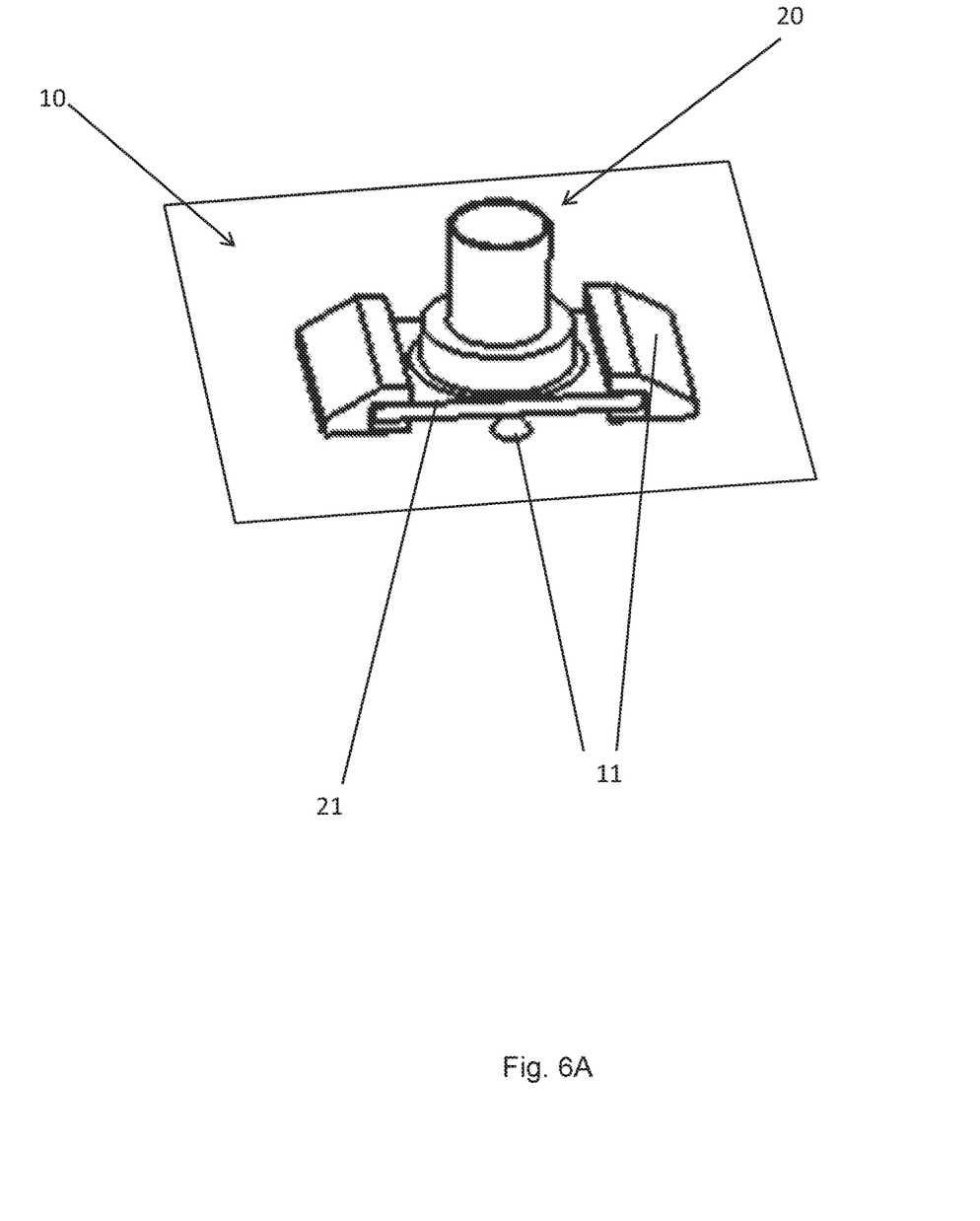
FIG. 6A-6D are views of other embodiments of an auxiliary device.

The auxiliary device 10 in FIG. 6A has four mounting elements 11 (of which only three are visible) in total. Two of the mounting elements 11 comprise recesses which adjoin the edges of the fastening element 21 of the connection part 20. The other two mounting elements 11 are in the form of raised portions on the upper face 13 of the device body 14. The mounting elements 11 also adjoin the fastening element 21 and secure the connection part 20 in the horizontal direction. In order to attach the connection part 20, it is in this case elastically deformed and subsequently returns to its original shape. Alternatively, it is possible for the connection part 20 to not fully return to its original shape, but rather be clamped by the mounting elements 11.

Figure 6B:
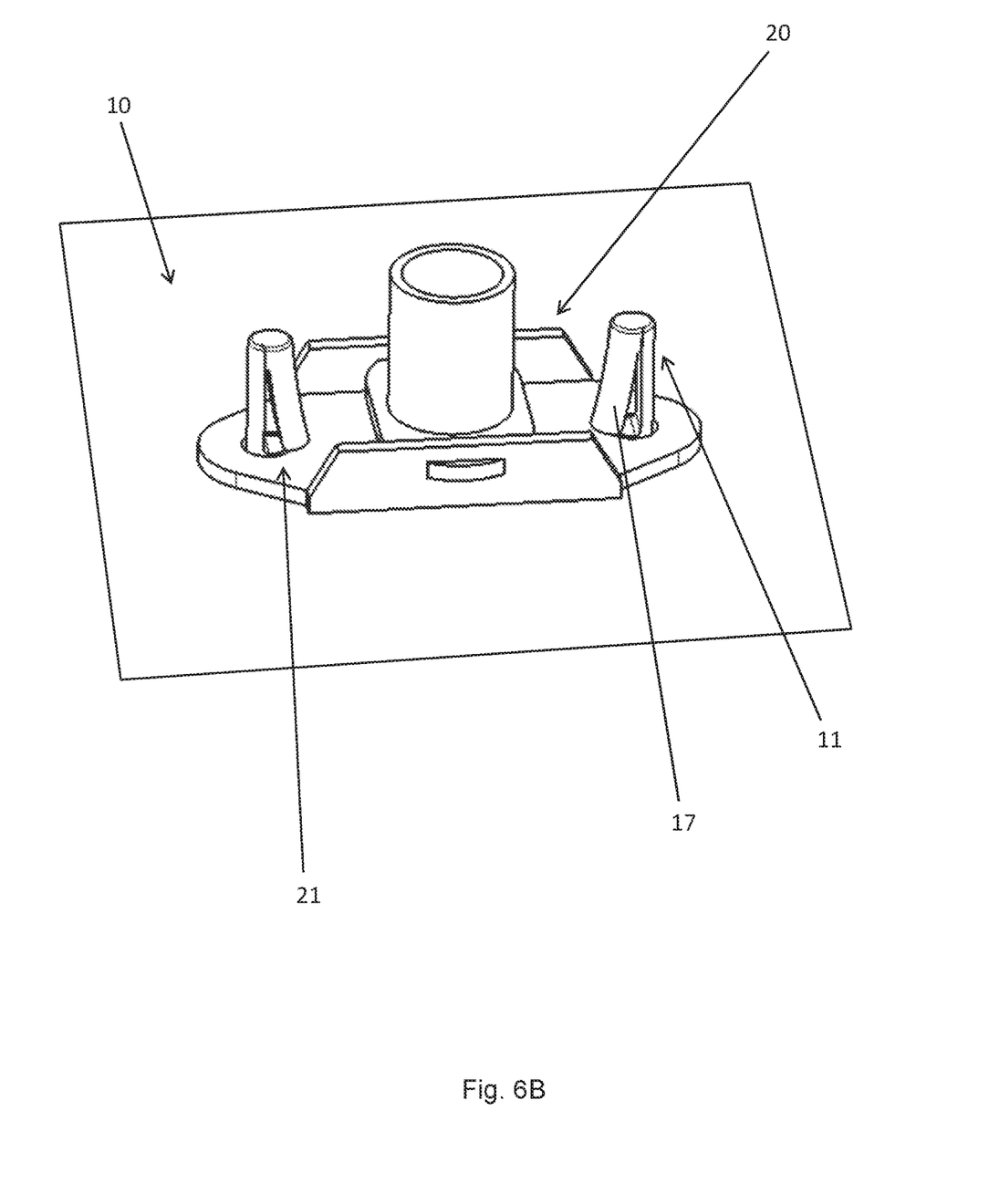

The auxiliary device 10 in FIG. 6B comprises two mounting elements 11 substantially designed or configured as columns. The mounting elements 11 additionally comprise spring elements 17. If the connection part 20 is attached to the auxiliary device 10, the fastening elements 21 designed or configured as holes slide over the mounting elements 11 and deform the spring elements 17. Subsequently, the spring elements 17 return to their original shape and secure the connection part 20 by positive engagement.

Figure 6C:
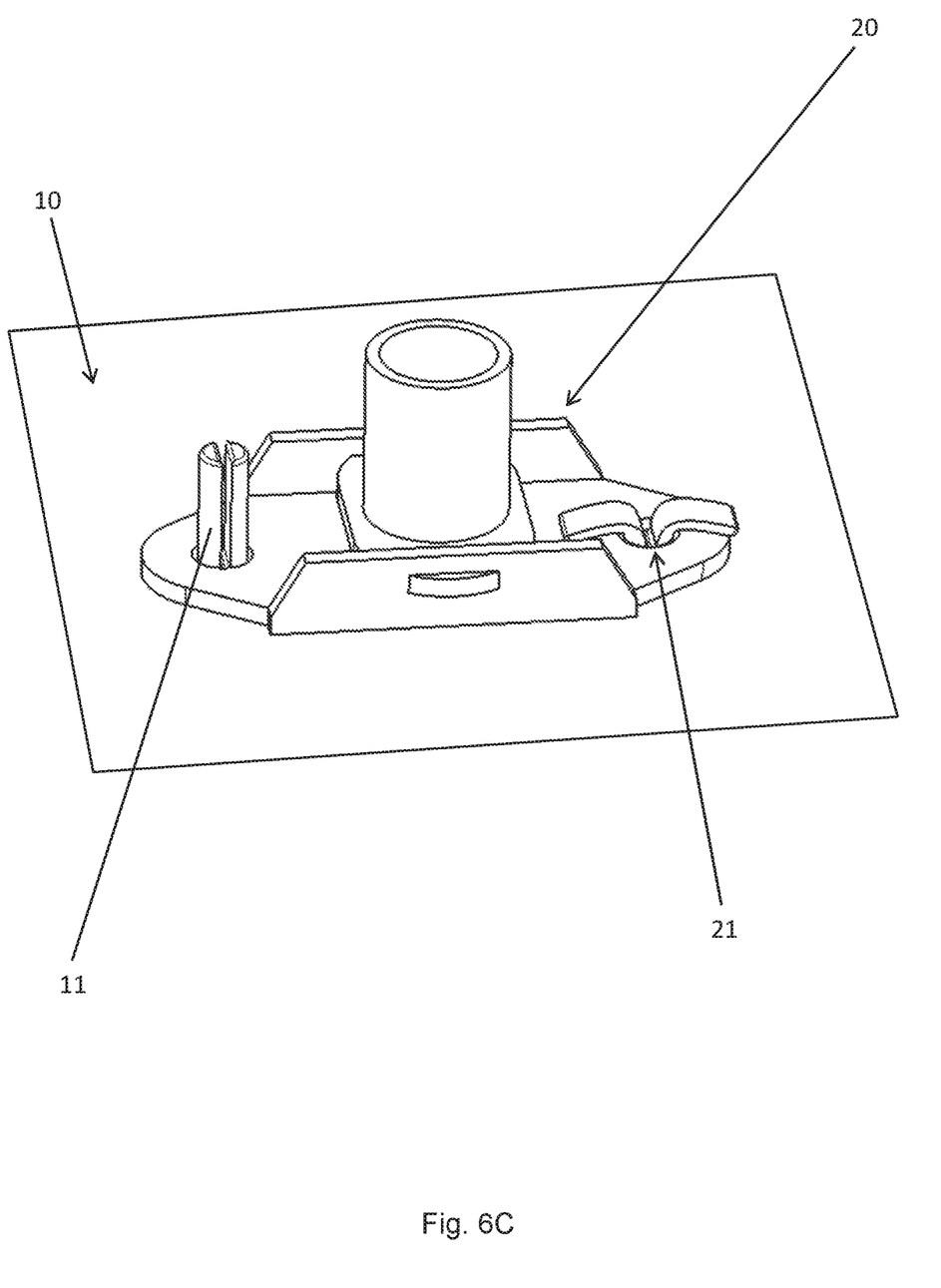

The auxiliary device 10 in FIG. 6C comprises two mounting elements 11 substantially designed or configured as columns. After attachment of the connection part 20 to the auxiliary device 10, the mounting elements 11 are plastically deformed, as shown on the right-hand mounting element 11, and secure the connection part 20 by positive engagement.

Figure 6D:
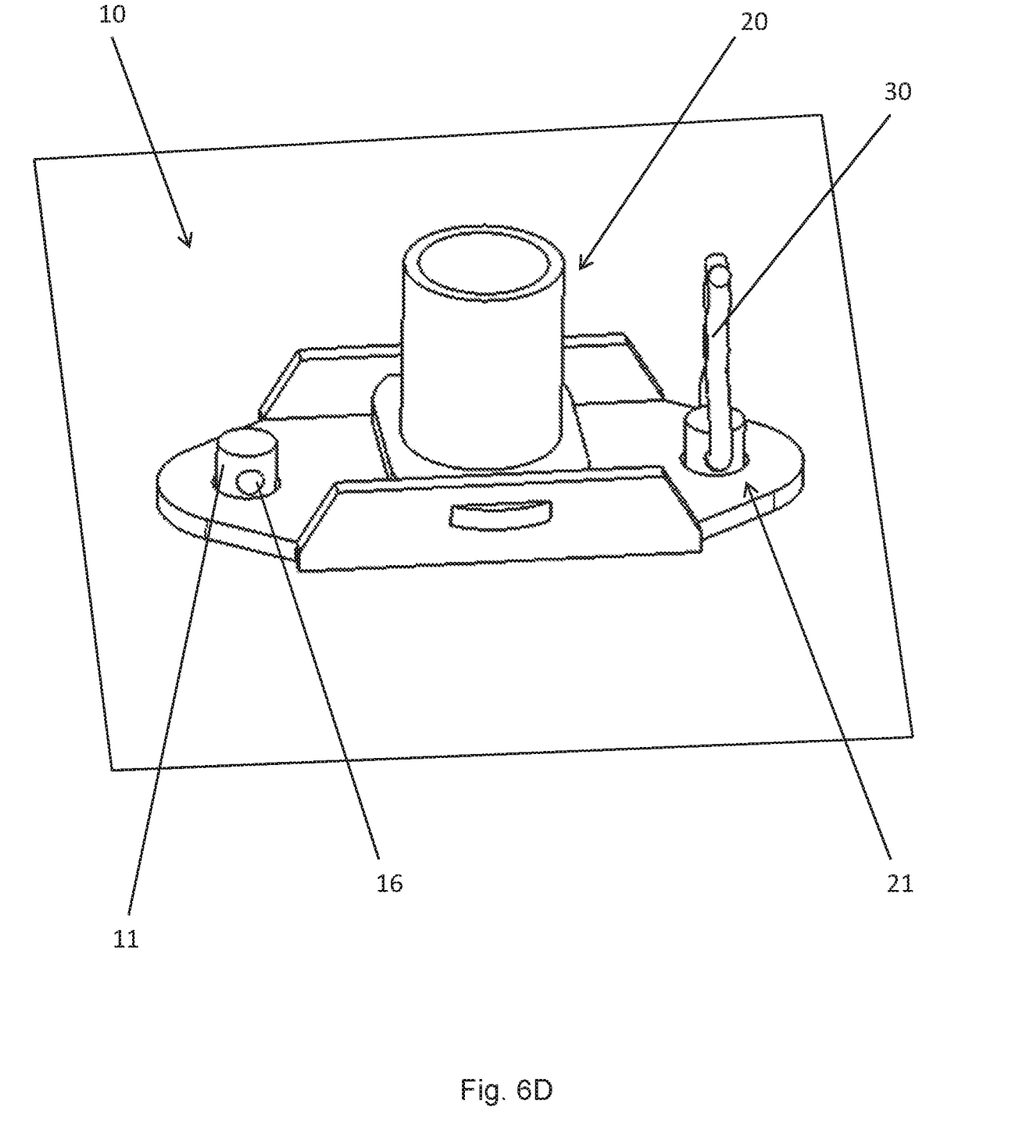

The auxiliary device 10 in FIG. 6D comprises two mounting elements 11 substantially designed or configured as columns. The mounting elements 11 additionally comprise through holes 16. After attachment of the connection part 20 to the auxiliary device 10, securing parts 30 designed or configured as wires are guided through the holes 16 and twisted. The securing parts 30 then secure the connection part 20 by positive engagement.

Although the present disclosure has been described above solely in terms of various embodiments, it is not limited thereto, but rather can be modified in a variety of ways. The components may be any conceivable components used in the manufacture of vehicles, in particular aircraft or spacecraft. Individual parts for the manufacture of bodywork, hulls, frames, wings, power units and the like are conceivable, for example.

The auxiliary devices described and the components may be manufactured by a variety of additive manufacturing processes, such as for example stereolithography, selective laser sintering, or selective laser melting. The connection parts described may also be produced by such or similar methods.

A plurality of materials, such as steel, titanium, aluminum, copper, alloys thereof, ceramics, or plastics materials, may be used for manufacture. The auxiliary device and the component may be manufactured from the same material or different materials.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An additively manufactured auxiliary device comprising:
   a device body, which comprises:
      a lower face, which is integrally connected to a component,
      at least one first mounting element comprising vertically upright plates extending from an upper face of the device body, and
      at least one second mounting element, which projects from the upper face of the device body, and
   a connection part comprising a contact face and at least one fastening element;
   wherein the at least one first mounting element and the at least one second mounting element are arranged such that the contact face and the at least one fastening element of the connection part is configured to be attached to the device body such that the contact face of the connection part rests against the upper face of the device body in a planar manner, each of the at least one first mounting element of the device body adjoins a side of the connection part, and each of the at least one second mounting element of the device body adjoins one of the at least one fastening element of the connection part; and
   wherein one or more of the at least one second mounting element is configured such that after attachment of the connection part to the device body, an additional securing part is configured to be attached to the one or more of the at least one second mounting element.

2. The auxiliary device of claim 1, wherein one or more of the at least one second mounting element comprises a through hole, which is configured such that the securing part is configured to be guided through the hole.

3. The auxiliary device of claim 1, wherein one or more of the at least one second mounting element is configured in a shape of a column, on which the connection part is placed via the at least one fastening element configured as a hole.

4. The auxiliary device of claim 3, wherein the mounting element comprises a narrowing in a region close to the upper face.

5. The auxiliary device of claim 1, wherein at least one mounting element comprises a recess, into which an edge of a fastening element of the connection part configured as a plate is configured to be inserted such that the mounting element secures the connection part by positive engagement.

6. The auxiliary device of claim 5, wherein the device body comprises at least one additional mounting element in a form of a raised portion, which secures the connection part after attachment thereof to the device body by positive engagement.

7. The auxiliary device of claim 5, wherein the device body comprises at least one additional mounting element in a form of a spring element, which is configured to secure the connection part after attachment thereof to the device body by positive engagement.

8. The auxiliary device of claim 1, wherein each of the at least one second mounting element comprises a spring element that is configured to secure the connection part after attachment thereof to the device body by positive engagement.

9. The auxiliary device of claim 1, wherein one or more of the at least one second mounting element is configured to be plastically deformed after attachment of the connection part to the device body, such that the one or more of the at least one second mounting element secures the connection part by positive engagement.

10. A method for attaching a connection part to a component, wherein the method comprises:
   placing a contact face of the connection part onto an upper face of an auxiliary device, which comprises at least one first mounting element and at least one second mounting element and is integrally connected to the component, wherein each of the at least one first mounting element of the auxiliary device adjoins a side of the connection part, and wherein each of the at least one second mounting element of the auxiliary device adjoins a fastening element of the connection part; and
   securing the connection part by positive engagement;
   wherein securing the connection part comprises attaching an additional securing part to the auxiliary device.

11. The method of claim 10, wherein the method, prior to placing the contact face, additionally comprises:
   elastically deforming the connection part;
   and wherein the connection part returns to its original shape fully or in part after placement.

12. The method of claim 10, wherein securing the connection part comprises plastically deforming one or more of the at least one second mounting element of the auxiliary device.

13. The method of claim 10, wherein the method, prior to the placing step, additionally comprises:
   elastically deforming one or more of the second mounting element of the auxiliary device configured as a spring element, and
   wherein the mounting element returns to its original shape fully or in part after placement.

* * * * *